W. H. Foulds,
Lock Hinge.

Nº 59,581.          Patented Nov. 13, 1866.

Witnesses:
J. W. Hewitt
E. C. Reynolds

Inventor:
William H. Foulds
by Coburn & Maris
attorneys

UNITED STATES PATENT OFFICE.

WILLIAM H. FOULDS, OF HENDERSON, KENTUCKY.

IMPROVED HINGES FOR WINDOW-SHUTTERS.

Specification forming part of Letters Patent No. 59,581, dated November 13, 1866.

*To all whom it may concern:*

Be it known that I, WILLIAM H. FOULDS, of Henderson, in the county of Henderson and State of Kentucky, have invented a new and useful Improvement in Hinges for Window-Shutters; and I do hereby declare and make known that the following is a full, clear, and exact description thereof, reference being had to the accompanying drawings, and the letters and figures marked thereon, which form part of this specification.

My said invention consists in so constructing the hinges of a window-shutter that upon being opened an automatic catch operates to hold the shutter open, which, upon being released, allows the shutter to close automatically, thus obviating all necessity for reaching out to grasp the shutter with the hand, either to release the catch or to close the shutter when desired.

To enable those skilled in the art to understand how to construct and use my invention, I will proceed to describe the same with particularity, making reference in so doing to the aforesaid drawings, in which—

Figure 1:
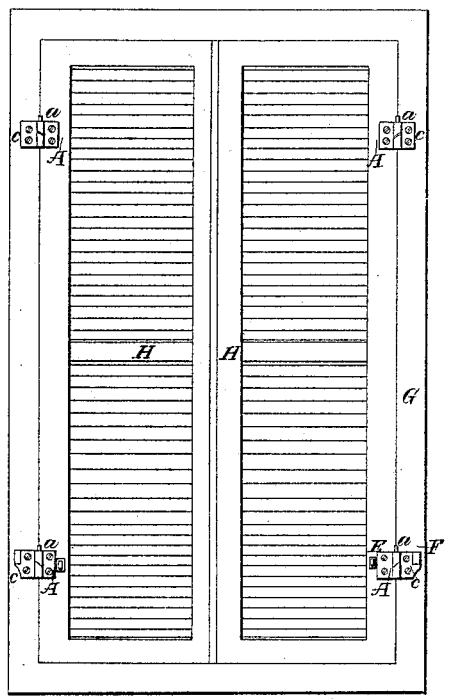
Figure 2:
Figure 3:
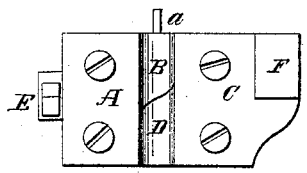
Figure 4:
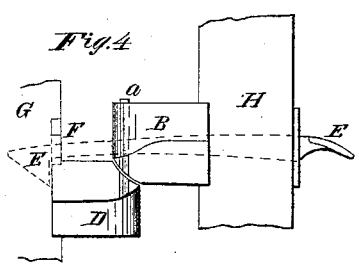

Figure 1 is a front elevation or view of my invention; Fig. 2, a side view thereof, the shutter being open; Fig. 3, an enlarged detached view as seen in Fig. 1, and Fig. 4 a similar view as represented in Fig. 2.

Similar letters of reference in the different figures denote the same parts of my invention.

H represents the shutters of a window, and G the window-frame to which they are hinged, as shown.

A B represent that part of the hinge which is attached to the shutter, and C D that part attached to the frame B, A and C being, respectively, the ordinary metallic plates of the hinge whereby the same are secured or fastened to the frame and shutter, as shown.

The bearing-surfaces of the hinges B D are spirally arranged, as shown, so that when the shutter is opened, turning upon the axis $a$, the hinge A B is gradually raised upon its bearing D as the shutter is forced back, until the shutter lies parallel with the wall of the house, when a lever, E, pivoted in the shutter and provided with a hook, as shown, enters and drops down into a catch or recess, F, in the window-frame, as shown clearly in Fig. 4.

When it is desired to close the shutter, the catch is released by pressing down upon the end of the lever E, when the weight of the shutter, acting upon the inclined or spiral bearing D, will cause the shutter to swing around and close automatically, as desired.

Having described the construction and operation of my invention, I will proceed to specify what I claim and desire to secure by Letters Patent:

In combination with a hinge so constructed that the weight of the shutter will close the same automatically, the arrangement of the recess F and catch E, operating substantially as specified, and for the purposes set forth.

WM. H. FOULDS.

Witnesses:
L. W. POWELL,
A. S. NUNN.